United States Patent [19]

Yoshimura et al.

[11] Patent Number: 4,656,197

[45] Date of Patent: Apr. 7, 1987

[54] PRE-FOAMED PARTICLES OF POLYETHYLENE RESIN

[75] Inventors: Shohei Yoshimura, Tomioka; Toru Yamaguchi; Masahiro Hashiba, both of Utsunomiya; Masato Kanbe, Hiratsuka, all of Japan

[73] Assignee: Japan Styrene Paper Corporation, Tokyo, Japan

[21] Appl. No.: 898,225

[22] Filed: Aug. 20, 1986

[51] Int. Cl.⁴ .............................. C08J 9/16; C08J 9/22
[52] U.S. Cl. ...................................... 521/56; 428/357; 428/402; 521/58; 521/60; 521/143
[58] Field of Search ..................... 521/56, 58, 60, 143; 428/357, 402

[56] References Cited

U.S. PATENT DOCUMENTS 4,247,650  1/1981  Shimizu et al. .................. 521/58
4,366,263 12/1982  Sato et al. ........................ 521/58

Primary Examiner—William J. Van Balen
Attorney, Agent, or Firm—Sherman and Shalloway

[57] ABSTRACT

Pre-foamed particles are formed of a polyethylene resin obtained by crosslinking a linear super-low density polyethylene having a density of 0.880–0.914 g/cm³ and a melt flow rate of 0.01–10 g/10 minutes. The gel content of the pre-foamed particles is 0.06–45%.

7 Claims, No Drawings

PRE-FOAMED PARTICLES OF POLYETHYLENE RESIN

BACKGROUND OF THE INVENTION

1. Field of the Invention

This invention relates to pre-foamed particles of a polyethylene resin, and more specifically to pre-foamed polyethylene particles suitable for use in the production of expansion-molded polyethylene articles excellent in both elongation and flexibility.

2. Description of the Prior Art

Expansion-molded polyethylene articles obtained by subjecting pre-foamed particles of a polyethylene resin to expansion molding have found wide-spread commercial utility as cushioning materials, heat-insulating materials, surface-protecting materials and miscellaneous other goods. Pre-foamed particles which have heretofore been employed for the production of molded articles of the above sort use, as base resins, branched polyethylene resins having long branch chains. Since it is necessary to adjust the melt viscosity of each of such base resins within a range suitable for its pre-foaming upon production of pre-foamed particles, the pre-foamed particles are imparted with a crosslinking degree as high as 50–70% in terms of gel content. For this reason, expansion-molded articles obtained eventually by using such pre-foamed particles were accompanied by a drawback that they were inferior in elongation, although they had good flexibility. As methods for improving such a drawback, it has been proposed to obtain an expansion-molded article by using a polyethylene-base resin the density and Vicat softening point of which fall within certain specific ranges (Japanese Patent Laid-Open No. 82828/1981), to obtain an expansion-molded article by using a polyethylene-base resin the melting point of which falls within a certain specific range (Japanese Patent Laid-Open No. 70621/1982), etc.

Expansion-molded articles obtained by these methods are however accompanied by a drawback that they are lowered in flexibility although they are improved in elongation. It is hence still difficult to obtain expansion-molded polyethylene articles excellent in both elongation and flexibility.

SUMMARY OF THE INVENTION

With the foregoing in view, the present invention has as its object the provision of pre-foamed particles of a polyethylene resin, which particles can afford expansion-molded articles excellent in both flexibility and elongation and good in moldability.

In one aspect of this invention, there is thus provided pre-foamed particles of a polyethylene resin, characterized in that said polyethylene resin has been formed by crosslinking a linear super-low density polyethylene having a density of 0.880–0.914 g/cm$^3$ and a melt flow rate (MFR) of 0.01–10 g/10 minutes and the gel content of the pre-foamed particles is 0.06–45%.

The pre-foamed particles of this invention have excellent moldability. They can hence provide an expansion-molded article which features good fusion-bonding among its individual foamed particles and are excellent in both flexibility and elongation. Moreover, the pre-foamed particles of this invention are obtained from a linear polyethylene of a super-low density of 0.880–0.914 g/cm$^3$. The pre-foamed particles have therefore another advantage that they can provide an expansion-molded article of a lighter weight than conventional expansion-molded articles so long as these expansion-molded articles have the same expansion ratio. The pre-foamed particles of this invention can therefore provide expansion-molded polyethylene articles excellent, especially, as cushioning materials, surface-protecting materials, heat-insulating materials and miscellaneous other goods.

The above and other objects, features and advantages of the present invention will become apparent from the following description and appended claims.

DETAILED DESCRIPTION OF THE INVENTION AND PREFERRED EMBODIMENT

In the present invention, a linear super-low density polyethylene is used as a base resin. The term "linear super-low density polyethylene" as used herein means a polyethylene which is linear and has a density lower than conventional low-density polyethylene. It may be prepared, for example, in the following manner.

Namely, a linear super-low density polyethylene can be obtained by polymerizing an ethylene-type monomer at a temperature of 40°–200° C. and a pressure of 2 kg/cm$^2$·G–60 kg/cm$^2$·G in the presence of a solid catalyst component, which has been obtained practically from anhydrous magnesium chloride, 1,1-dichloroethane and titanium tetrachloride, a catalyst composed of triethyl aluminum, etc.

The linear super-low density polyethylene (hereinafter abbreviated as "LSLDPE") useful in the practice of this invention is required to have a density of 0.880–0.914 g/cm$^2$, preferably, 0.890–0.912 g/cm$^2$ and an MFR of 0.01–10 g/10 minutes, preferably, 0.1–9.0 g/10 minutes. Although LSLDPEs having densities lower than 0.880 g/cm$^3$ can be produced theoretically, such LSLDPEs have lower melting points and higher amorphousness and are hence undesirable.

If the density exceeds 0.914 g/cm$^3$, the resulting pre-foamed particles can only provide molded articles having inferior flexibility, elongation and tear strength.

Any MFRs smaller than 0.01 g/10 minutes result in poor processability, while any MFRs greater than 10 g/10 minutes lead to non-uniform crosslinking, reduced crosslinking efficiency and lowered physical properties. The crosslinking of an LSLDPE may be conducted either before the preparation of pre-foamed particles or at the same time as the production of pre-foamed particles. As crosslinking methods for the LSLDPE, there may be mentioned crosslinking by exposure to electron beams, crosslinking by kneading a chemical crosslinking agent with the LSLDPE and then heating the resultant mixture, crosslinking by dispersion of the LSLDPE and a chemical crosslinking agent in a dispersion medium and then heating the resulting dispersion, and so on. As the chemical crosslinking agent, may be employed dicumyl peroxide, t-butylcumyl peroxide, 2,5-dimethyl-2,5-di-t-(butylperoxy)-hexene-3,2,2-bis(t-butylperoxy )propane, bis-(t-butylperoxy)-diphenylsilane, etc. It is also feasible to use a crosslinking additive such as divinyl benzene in combination with the above-described crosslinking agent as needed.

The pre-foamed particles of this invention are formed of a resin which has been obtained by cross-linking the above-described LSLDPE. The pre-foamed particles are required to have such a crosslinking degree as 0.06–45%, preferably, 1.0–40% in terms of gel content. Here, the term "the gel content of pre-foamed particles" means a value indicating the ratio in % of the weight of a xylene-undissolved portion of the pre-foamed particles, when the pre-foamed particles were cooked for 8 hours in boiling xylene subsequent to substitution of air for a foaming agent contained in the pre-foamed particles, to the weight of the pre-foamed particles before their cooking. In the case of pre-foamed particles having a low crosslinking degree smaller than 0.06%, the permissible heating temperature range upon expansion-molding of the pre-foamed particles is narrow, thereby making it difficult to perform their expansion molding with ease. In the case of pre-foamed particles having a high crosslinking degree exceeding 45% on the other hand, a great deal of thermal energy must be furnished upon their molding and at the same time, the fusion-bonding strength of foamed particles in the resulting expansion-molded article is lowered.

The cell diameter of the pre-foamed particles of this invention may preferably range from 10–2000 μm, notably, 20–1500 μm. If the cell diameter falls outside the above range, there is a potential danger that even if the pre-foamed particles have been obtained from a polyethylene having a super-low density of 0.914 g/cm$^3$ or lower, the resulting expansion-molded article obtained finally from the pre-foamed particles would have inferior elongation or insufficient stiffness.

Incidentally, the term "the cell diameter of pre-foamed particles" as used herein means the average cell diameter of pre-foamed particles, which is determined by slicing pre-foamed particles and then measuring their cell diameters through an optical microscope.

An exemplary preparation process of pre-foamed particles of this invention will next be described, supposing that an LSLDPE is crosslinked with a chemical foaming agent prior to its pre-foaming.

First of all, LSLDPE particles and the chemical foaming agent in an amount of 0.1–2.0 parts per 100 parts of the particles are dispersed in a dispersion medium and then heated to effect crosslinking of the LSLDPE. As the dispersion medium, any solvent which does not dissolve the resin, namely, water, ethylene glycol, glycerin, methanol, ethanol or the like may be used. Water is however used usually. Although the heating temperature may vary depending on the melting point of each LSLDPE and the type of each chemical crosslinking agent to be employed, it generally ranges from 130° to 180° C. The LSLDPE can be crosslinked by conducting the above-mentioned heating for 0.5–5 hours with stirring in the above manner. Upon this crosslinking, one or more dispersing agents, for example, fine particulate aluminum oxide, titanium oxide, basic magnesium carbonate, basic zinc carbonate, calcuim carbonate and/or the like may be used.

The thus-crosslinked LSLDPE particles are then pre-foamed. This pre-foaming is carried out in the following manner. The above-crosslinked LSLDPE particles are dispersed together with a foaming agent in an amount of 10–30 parts per 100 parts of the LSLDPE particles in a dispersion medium within a closed vessel. After heating the resulting dispersion to a temperature equal to or higher than (the melting point of the crosslinked LSLDPE particles −5° C.), preferably, to a temperature in a range of from (the melting point −2° C.) to (the melting point +30° C.), the crosslinked LSLDPE particles and dispersion medium are released into an atmosphere of a pressure lower than the internal pressure of the vessel, usually, under the atmospheric pressure so that the crosslinked LSLDPE particles are foamed to obtain pre-foamed particles. As the foaming agent usable in their foaming, may be mentioned an inorganic foaming agent such as carbon dioxide or air, a volatile organic foaming agent such as propane, butane, pentane, hexane, dichlorodifluoromethane, dichlorotetrafluoroetane, or the like. As the dispersion medium, a dispersion medium similar to the above-described dispersion medium usable in the crosslinking of the LSLDPE may also be used.

A dispersing agent can also be used upon pre-foaming if necessary. As the dispersing agent, a dispersing agent similar to the above-described dispersing medium usable in the crosslinking of the LSLDPE may also be used.

The pre-foamed particles of this invention, which have been obtained in the above-described manner, are then subjected to a pressurization treatment by the above-described inorganic gas or a mixed gas of the above-mentioned inorganic gas and volatile foaming agent to impart an internal pressure of 0.5–3 kg/cm$^2$(G). Thereafter, the pre-foamed particles are filled in a mold and heated with steam of 1.8–4.5 kg/cm$^2$(G) or the like so as to cause the pre-foamed particles to foam and expand there. Accordingly, the particles are fusion-bonded mutually to obtain an expansion-molded article the shape of which conforms with the mold.

EXAMPLES

The present invention will hereinafter be described in further detail by the following Examples.

Examples 1–9 & Comparative Examples 1–10

One hundred parts of an uncrosslinked resin particles shown in Table 1 were dispersed together with dicumyl peroxide in its corresponding amount given in the same table in water, followed by its crosslinking under its corresponding conditions shown in the same table. Then, 100 parts of the crosslinked resin particles, 100 parts of water and dichlorodifluoromethane in its corresponding amount given in Table 2 were charged in a sealed vessel. After heating the contents to a corresponding foaming temperature shown in the same table and holding them at the same temperature for 0.5 hour, the vessel was opened at one end thereof while holding the internal pressure of the vessel at 35 kg/cm$^2$(G) with nitrogen gas, so that the resin particles and water were released under the atmospheric pressure to pre-foam the resin particles, thereby obtaining pre-foamed particles (crosslinking was not performed in Comparative Example 5). The gel contents, cell diameters and apparent expansion ratios of the resultant pre-foamed particles are also shown in Table 2. After the thus-obtained pre-foamed particles were left over and aged for 24 hours under the atmospheric pressure, they were separately subjected to a pressurizing treatment with air of 2 kg/cm$^2$(G) for 48 hours to impart their respective internal pressures shown in Table 2.

The pre-foamed particles, which had been subjected to the pressurizing treatment, were separately filled in molds of 300 mm×300 mm×50 mm (internal dimensions) and then heated with steam of a pressure given in Table 3 to obtain expansion-molded articles. After drying the thus-obtained expansion-molded articles for 60 hours in an over of 55° C., the flexibility and expansion of each of the expansion-molded articles were measured. Results are shown in Table 3.

TABLE 1

| | Uncrosslinked resin particles | | | | Crosslinking conditions | | |
|---|---|---|---|---|---|---|---|
| | Density (g/cm³) | MFR (g/10 min) | MP (°C.) | Kind | Dicumyl peroxide (parts) | Temp. (°C.) | Time (hr) |
| Example | | | | | | | |
| 1 | 0.890 | 0.8 | 123 | Linear super low-density polyethylene | 0.40 | 150 | 2 |
| 2 | 0.890 | 4.6 | 123 | Linear super low-density polyethylene | 0.45 | 150 | 2 |
| 3 | 0.890 | 8.3 | 122 | Linear super low-density polyethylene | 0.50 | 150 | 2 |
| 4 | 0.905 | 1.2 | 120 | Linear super low-density polyethylene | 0.40 | 150 | 2 |
| 5 | 0.905 | 3.7 | 121 | Linear super low-density polyethylene | 0.40 | 150 | 2 |
| 6 | 0.905 | 7.1 | 121 | Linear super low-density polyethylene | 0.50 | 150 | 2 |
| 7 | 0.910 | 1.1 | 120 | Linear super low-density polyethylene | 0.40 | 150 | 2 |
| 8 | 0.910 | 6.5 | 120 | Linear super low-density polyethylene | 0.50 | 150 | 2 |
| 9 | 0.912 | 6.3 | 121 | Linear super low-density polyethylene | 0.40 | 150 | 2 |
| Comparative Example | | | | | | | |
| 1 | 0.934 | 5.0 | 125 | Linear low-density polyethylene | 0.55 | 150 | 2 |
| 2 | 0.965 | 0.3 | 136 | High density polyethylene | 0.32 | 150 | 2 |
| 3 | 0.923 | 5.0 | 108 | Branched low-density polyethylene | 0.60 | 150 | 2 |
| 4 | 0.890 | 0.05 | 123 | Linear super low-density polyethylene | 0.45 | 150 | 2 |
| 5 | 0.890 | 0.8 | 123 | Linear super low-density polyethylene | — | — | — |
| 6 | 0.905 | 0.08 | 120 | Linear super low-density polyethylene | 0.48 | 150 | 2 |
| 7 | 0.910 | 12.0 | 120 | Linear super low-density polyethylene | 0.48 | 150 | 2 |
| 8 | 0.910 | 7.6 | 123 | Linear super low-density polyethylene | 0.60 | 150 | 2 |
| 9 | 0.912 | 10.8 | 121 | Linear super low-density polyethylene | 0.60 | 150 | 2 |
| 10 | 0.912 | 6.3 | 121 | Linear super low-density polyethylene | 0.50 | 150 | 2 |

TABLE 2

| | Foaming conditions | | Pre-foamed particles | | | |
|---|---|---|---|---|---|---|
| | Foaming temperature (°C.) | Amount of dichloro-difluoromethane (parts) | Gel content (%) | Cell diameter (μm) | Apparent expansion ratio (times) | Internal pressure (kg/cm² G) |
| Example | | | | | | |
| 1 | 143 | 25 | 32 | 30 | 23 | 0.9 |
| 2 | 143 | 25 | 25 | 150 | 30 | 1.0 |
| 3 | 142 | 20 | 16 | 220 | 25 | 1.3 |
| 4 | 140 | 25 | 30 | 100 | 26 | 1.1 |
| 5 | 141 | 25 | 27 | 130 | 28 | 1.0 |
| 6 | 141 | 20 | 18 | 200 | 22 | 1.0 |
| 7 | 140 | 25 | 30 | 110 | 25 | 1.2 |
| 8 | 140 | 20 | 19 | 210 | 20 | 1.2 |
| 9 | 141 | 25 | 26 | 250 | 20 | 0.9 |
| Comparative Example | | | | | | |
| 1 | 145 | 25 | 5.9 | 100 | 25 | 1.1 |
| 2 | 150 | 25 | 50 | 220 | 25 | 1.3 |
| 3 | 115 | 30 | 41 | 350 | 25 | 1.1 |
| 4 | 143 | 30 | 48 | 20 | 25 | 1.2 |
| 5 | 143 | 25 | 0 | Considerable fusion-bonding was observed among pre-foamed particles and their cells were mainly open cells. | | |
| 6 | 140 | 30 | 53 | 900 | 20 | 1.2 |
| 7 | 140 | 25 | 25 | 2500 | 30 | 1.1 |
| 8 | 143 | 35 | 60 | 180 | 21 | 1.2 |
| 9 | 141 | 25 | 22 | 450 | 32 | 1.0 |
| 10 | 141 | 30 | 56 | 25 | 20 | 1.1 |

TABLE 3

| | Molding steam pressure (kg/cm² G) | Flexibility[1] of molded article | Elongation of[2] molded article | | Tear strength[3] of molded article | | Overall[4] evaluation |
|---|---|---|---|---|---|---|---|
| | | | Elongation (%) | Evaluation | Strength (kg/cm) | Evaluation | |
| Example | | | | | | | |
| 1 | 2.8 | | 132 | | 3.2 | | |
| 2 | 2.8 | | 136 | | 3.3 | | |
| 3 | 2.8 | | 133 | | 3.6 | | |
| 4 | 2.8 | | 130 | | 3.3 | | |
| 5 | 2.8 | | 134 | | 3.5 | | |
| 6 | 2.8 | | 128 | | 3.7 | | |
| 7 | 2.8 | | 134 | | 3.5 | | |
| 8 | 2.8 | | 120 | | 3.8 | | |
| 9 | 2.8 | | 135 | | 3.6 | | |
| Comparative Example | | | | | | | |
| 1 | 2.8 | Δ | 70 | X | 1.9 | X | X |
| 2 | 2.8 | X | 46 | X | 2.9 | Δ | X |
| 3 | 2.8 | X | 42 | X | 1.7 | X | X |
| 4 | 2.8 | X | 40 | X | 2.5 | Δ | X |
| 5 | | | Molding was not feasible. | | | | |
| 6 | 2.8 | X | 38 | X | 2.2 | Δ | X |
| 7 | 2.8 | X | 48 | X | 2.8 | Δ | X |
| 8 | 2.8 | X | 45 | X | 2.0 | Δ | X |
| 9 | 2.8 | Δ | 80 | Δ | 1.5 | X | X |
| 10 | 2.8 | X | 30 | X | 1.2 | X | X |

Note:
[1] The flexibility of each molded article was expressed in accordance with the following standard when a specimen of 25 mm thick, 50 mm wide and 300 mm long was cut out from the molded article, a slit was formed to a thickness of 2 mm at a longitudinal central area of the specimen, the specimen was folded over 180° along a cylinder of 50 mm across with the slit-containing side opposite to the cylinder, and the appearance of the specimen was observed.
 : No changes were observed at all in the specimen.
Δ: The specimen developed some cracks.
X: The specimen was broken.
[2] The elongation of each molded article was measured by conducting its elongation test in accordance with the elongation testing method A prescribed in JIS-K-6767. The elongation was expressed in accordance with the following standard.
 : 100% or greater.
Δ: 80%–100% (exclusive of 100%).
X: smaller than 80%.
[3] The tensile strength of each molded article when measured in accordance with the testing method prescribed in JIS-K-6767.
 : 3.0 kg/cm² or higher.
Δ: 2.0 kg/cm²–3.0 kg/cm² (exclusive of 3.0 kg/cm²).
X: lower than 2.0 kg/cm.
[4] The overall evaluation of each sample was made in accordance with the following standard on the basis of test results on the "flexibility of its molded article", "elongation of its molded article" and "tear strength of its molded article".
 : All test results are  .
X: At least one test result is X.

Having now fully described the invention, it will be apparent to one of ordinary skill in the art that many changes and modifications can be made thereof without departing from the spirit or scope of the invention as set forth herein.

What is claimed is:

1. Pre-foamed particles of a polyethylene resin, characterized in that said polyethylene resin has been formed by crosslinking a linear super-low density polyethylene having a density of 0.880–0.914 g/cm³ and a melt flow rate of 0.01–10 g/10 minutes and the gel content of the pre-foamed particles is 0.06–45%.

2. The pre-foamed particles as claimed in claim 1, wherein the density of the linear super-low density polyethylene is 0.890–0.912 g/cm³.

3. The pre-foamed particles as claimed in claim 1, wherein the melt flow rate of the linear super-low density polyethylene is 0.1–9.0 g/10 minutes.

4. The pre-foamed particles as claimed in claim 1, wherein the cell diameter of the pre-foamed particles is 10–2000 μm.

5. The pre-foamed particles as claimed in claim 1, wherein the cell diameter in the pre-foamed particles is 20–1500 μm.

6. The pre-foamed particles as claimed in claim 1, wherein the density and melt flow rate of the linear super-low density are 0.890–0.912 g/cm³ and 0.9–9.0 g/10 minutes respectively, and the cell diameter of the pre-foamed particles are 10–2000 μm.

7. The pre-foamed particles as claimed in claim 6, wherein the cell diameter of the pre-foamed particles are 20–1500 μm.

* * * * *